(No Model.)
T. J. BOTTOMS.
COMBINATION CULTIVATOR.
No. 508,912. Patented Nov. 21, 1893.
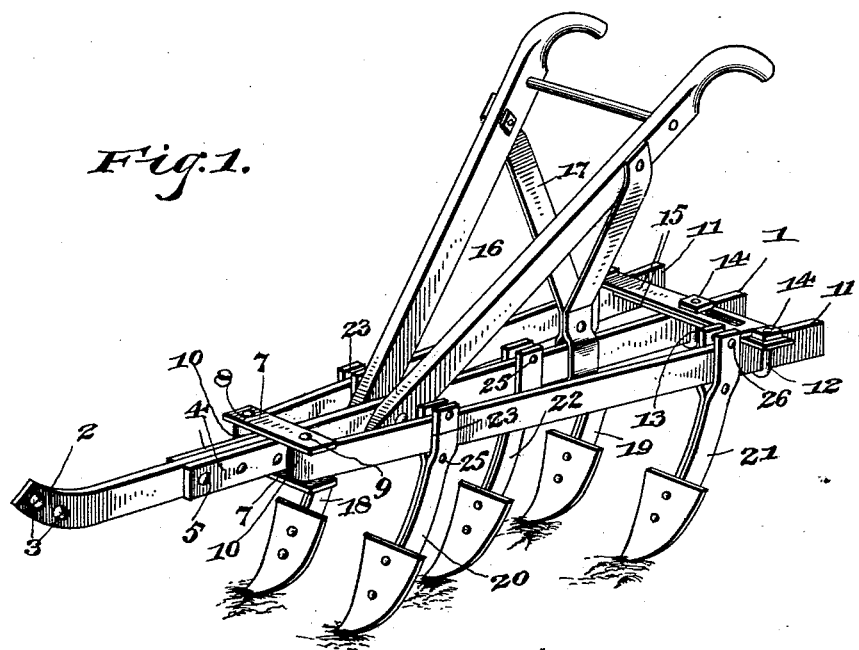
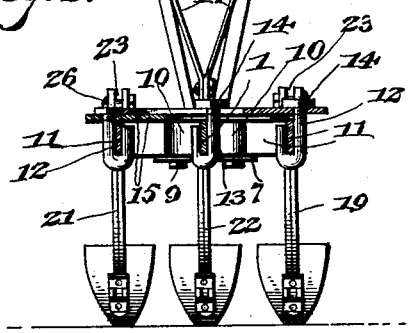
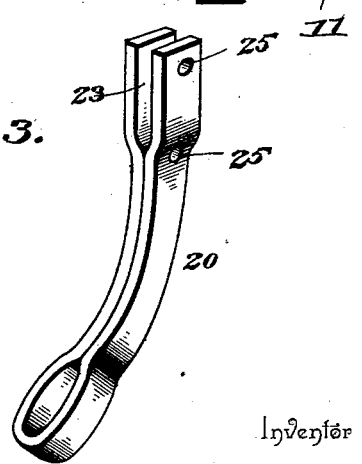
Witnesses
Inventor
Thomas J. Bottoms,
By his Attorneys,
C. A. Snow & Co.

UNITED STATES PATENT OFFICE.

THOMAS J. BOTTOMS, OF FAYETTE COUNTY, GEORGIA.

COMBINATION-CULTIVATOR.

SPECIFICATION forming part of Letters Patent No. 508,912, dated November 21, 1893.

Application filed August 29, 1893. Serial No. 484,324. (No model.)

*To all whom it may concern:*

Be it known that I, THOMAS J. BOTTOMS, a citizen of the United States, residing in the county of Fayette (Jonesborough P. O.) and State of Georgia, have invented a new and useful Combination-Cultivator, of which the following is a specification.

My invention relates to agricultural implements and has special reference to improvements in that class of the same designed to cultivate the ground.

The objects of my invention are to produce what might be called a combination implement or machine, the same being so constructed as to serve the purposes of a harrow, a straddle row cultivator, a plow, a three foot cultivator or a straddle stock for covering drills; to arrange for a ready conversion from one form of machine to any of the others mentioned; and with all to accomplish the same in a cheap and simple manner.

With these objects in view the invention consists in certain features of construction hereinafter specified and particularly pointed out in the claims.

Referring to the drawings:—Figure 1 is a perspective view of a machine or implement constructed in accordance with my invention. Fig. 2 is a transverse sectional view through the rear end of the machine illustrating the manner of securing the lateral adjustment. Fig. 3 is a detail in perspective of one of the standards. Fig. 4 is a partial plan view of the machine the clip plate being removed and showing the pivotal joint.

Like numerals indicate like parts in all the figures of the drawings.

In embodying my invention I employ a central main beam 1, whose front end I extend and upturn to form a draft end 2, having a series of perforations 3, to any one of which proper draft appliances may be connected. The opposite sides of this beam are near its front end, or immediately in rear of its upturned end, clamped or embraced by a pair of opposite metal plates 4, a rivet or bolt 5, passing laterally through the beam and plates. The rear ends of these plates 4, are oppositely and laterally bent as at 6. Upper and lower horizontal plates 7, are arranged upon the upper and under sides of the plates 4, and beams 1 and 11 and are provided at each side thereof or near their ends with perforations 8, downwardly through which pass pivoting bolts 9. These pivoting bolts 9, pass loosely through eyes 10, that are formed at the front end of a pair of auxiliary or side beams 11, that are arranged at opposite sides of the main beam 1, and terminate at their rear ends coincident therewith. The eyes 10, of the auxiliary beam rest in the laterally curved ends of the plates 4, said eyes being formed at the inner sides of the said auxiliary beams so that, as will be obvious, the said plates 4, serve as draft plates. Upon the two side or auxiliary beams 11, at their rear ends are mounted staple bolts 12, the same embracing the opposite sides and lower edges of the beams and having their threaded shanks extending thereabove. A similar bolt 13, is mounted on the rear end of the central or main beam 1. These bolts are each provided with nuts 14, by which they may be clamped in position. Adjusting bars 15, are pivoted at their ends to the bolts 12, and at their inner ends overlap each other and are longitudinally slotted to receive the shank of the central bolt 13. Through the medium of this central bolt the said plates may be adjusted longitudinally one upon the other and thus the auxiliary beams adjusted laterally, that is to and from the main beam, all as will be obvious. Bolted as at 15, to the opposite sides of the main beam immediately in rear of the draft plates 5, is a pair of upwardly disposed diverging handles 16, and a Y-shaped brace or standard 17, has its lower portion bolted to the main beam 1 and its upper terminal bolted to said handle.

At the right side of the machine are secured front and rear standards 18 and 19 respectively. Upon the left side of the machine are secured standards 20 and 21, respectively, while at the center upon the main beam there is secured a standard 22, making five standards in all. Each standard is bifurcated at its upper end as at 23, to embrace its respective beam and is provided above and below the same with perforations or transversely opposite bolt holes 25, through which bolts 26 are passed. It will be seen that each standard therefore, is adjustable longitudinally upon its beam, and is also removable for a purpose hereinafter obvious.

As the machine stands, with all five standards in position it being understood that they are to be provided with suitable shovels or plows, it is designed to serve as a harrow. Now by a removal of all of the standards of the auxiliary beams and a suitable adjustment of the central standard 22, and a removal of said beams we have a plow of the single foot pattern. By removing the front standard of one auxiliary beam and the rear standard of another we have a three foot cultivator either right or left, and by a removal of the central standard we have a straddle row cultivator. In this manner various combinations may be produced. I furthermore provide for a lateral adjustment of the auxiliary beams which may be utilized in the various combinations mentioned.

From the foregoing description in connection with the drawings it will be seen that I have provided a combination cultivator, the whole combined in one implement or machine and each designed to efficiently accomplish its own function and to be converted from one to the other in a ready manner.

Having described my invention, what I claim is—

1. In a combination implement of the class described, the combination with a central main beam, of opposite draft plates secured to the opposite sides thereof and terminating at their rear ends in lateral deflections, upper and lower perforated plates embracing the top and bottom of the draft plates and beam and arranged in front of the deflections, side beams having eyes at their inner front ends engaging the deflections, pivoting bolts passed through the perforated plates and eyes, means for adjusting the rear ends of the side and central beams, and shovel carrying standards secured to the beams, substantially as specified.

2. In a combination implement of the class described, the combination with the main and pivoted side beams arranged at opposite sides of the main beam, shovel carrying standards for the beams, of staple shaped bolts arranged adjustably on the ends of the three beams and provided with threaded shanks and nuts, and adjusting bars pivoted at their outer ends upon the bolts of the side beams and slotted and receiving the bolt of the central beam, substantially as specified.

In testimony that I claim the foregoing as my own I have hereto affixed my signature in the presence of two witnesses.

THOMAS J. BOTTOMS.

Witnesses:
GEO. W. BOTTOMS,
B. L. McGOUGH.